May 21, 1963

J. R. HARKNESS 3,090,875

THERMOELECTRODYNAMIC PRIME MOVERS

Filed April 7, 1960

Joseph R. Harkness
By Ira Milton Jones
Attorney

May 21, 1963
J. R. HARKNESS
3,090,875
THERMOELECTRODYNAMIC PRIME MOVERS
Filed April 7, 1960
3 Sheets-Sheet 2
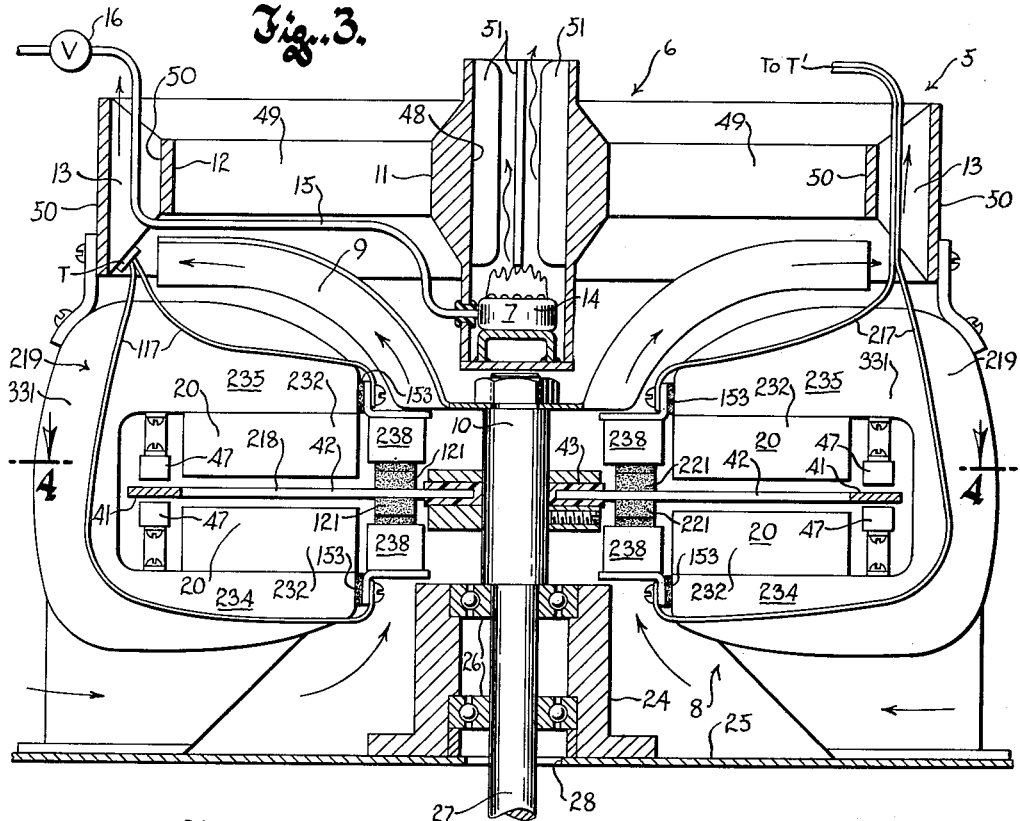
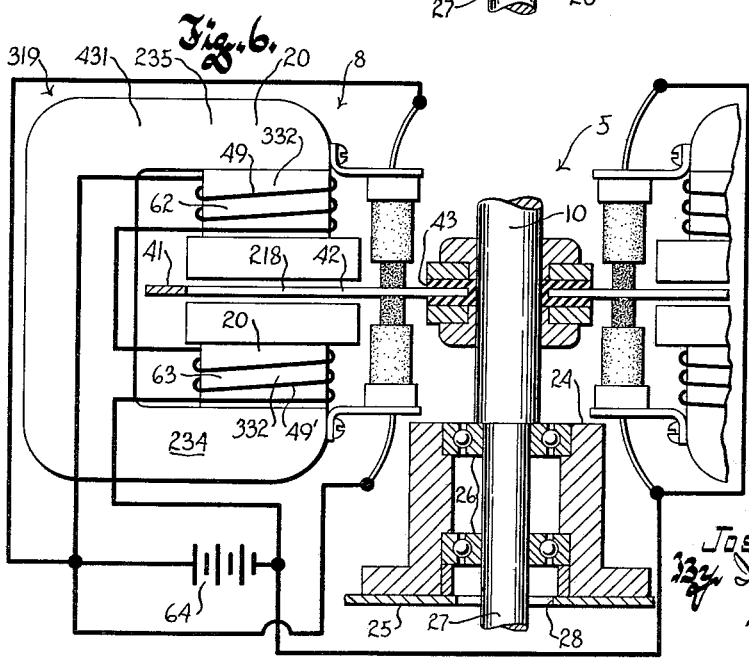
Inventor
Joseph R. Harkness
By Ira Milton Jones
Attorney

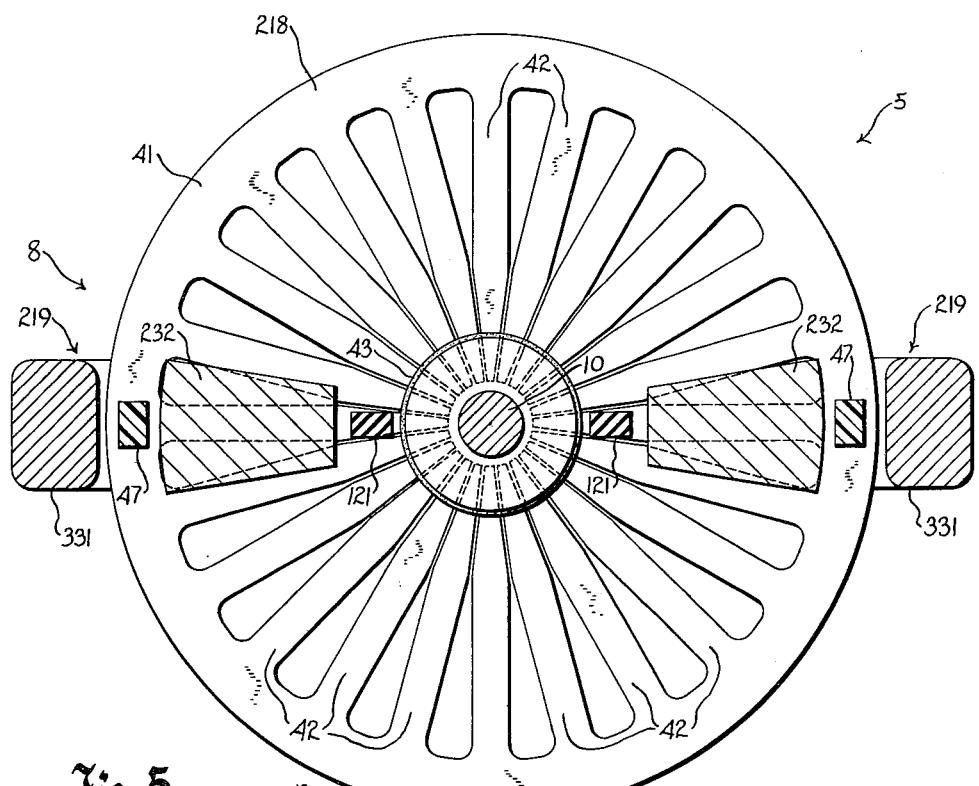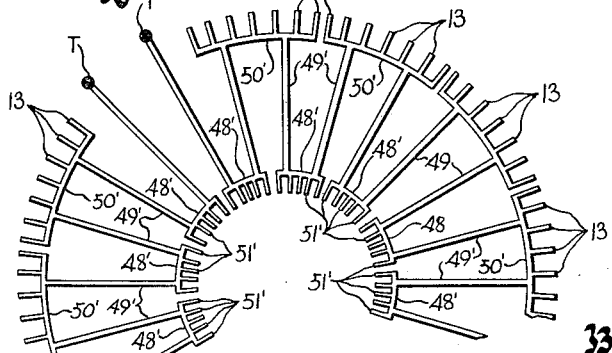

United States Patent Office 3,090,875
Patented May 21, 1963

3,090,875
THERMOELECTRODYNAMIC PRIME MOVERS
Joseph R. Harkness, Milwaukee, Wis., assignor to Briggs
& Stratton Corporation, Milwaukee, Wis., a corporation
of Delaware
Filed Apr. 7, 1960, Ser. No. 20,662
14 Claims. (Cl. 310—4)

This invention relates to thermoelectrodynamic prime movers and refers more particularly to devices of the type comprising a thermocouple or thermopile, and an electric motor connected with such a thermoelectric current generating device for energization thereby.

Recent progress in the development of thermocouples and thermopiles has offered the possibility of using such a device as a component of a prime mover comprising a heat source, a thermocouple or thermopile exposed to heat from the source and to cooling air, and an electric motor connected with the thermocouple for energization by current which the thermocouple generates as a result of the temperature difference across it. Such a machine is extremely quiet in operation and requires almost no maintenance, but to be suitable for powering portable equipment, and even for many stationary applications, it must be reasonably inexpensive, light, compact and efficient.

In general it is the object of the present invention to provide a thermoelectrodynamic prime mover having to a marked degree the attributes of low cost, lightness, compactness and efficiency, and which is therefore particularly well suited for use in applications where small internal combustion engines have heretofore been employed.

More specifically, it is an object of this invention to provide a thermoelectrodynamic prime mover of the character described wherein the components of the machine are associated with one another in an arrangement which affords great compactness, particularly by reason of the provision of an annular thermocouple, a motor energized by the thermocouple and disposed coaxially with the thermocouple, and a fan for cooling the cold junction of the thermocouple which is coaxially driven by the motor.

Other objects of this invention relate to the problems posed by the characteristic low voltage output of thermocouples and thermopiles. Although the current generated by a thermocouple is substantially in proportion to its size and is therefore limited only by practical considerations, the voltage of the output is very low, even when individual thermocouples are connected in series in a thermopile, unless the thermopile comprises an inordinately large number of thermocouples. It has been thought heretofore that practical utilization of the output of thermocouples required the provision of an inverter or the like for stepping up voltage, but any device for voltage step-up increases the size, weight and complexity of the prime mover without actually improving its overall efficiency. However, if the low voltage D.C. output of a thermocouple or thermopile is to be delivered directly to a motor, the conductors for transmitting electrical energy from the thermocouple to the motor must have very low losses and the motor must be of a type that can operate efficiently with low voltage, high current energization.

With the foregoing considerations in mind, it is another object of this invention to provide a thermoelectrodynamic prime mover which requires no inverter or other voltage step-up means, and wherein the arrangement of the thermocouple or thermopile and the motor energized by it is so compact as to permit very short conductors to be used for connecting the current source with the motor, thus minimizing electrical transmission losses.

In this same connection it is also an object of this invention to provide a thermoelectrodynamic prime mover which advantageously incorporates a known motor that is suitable for energization from a low voltage high current D.C. source.

While motors are known that are suitable for energization by the low voltage high current output of a thermocouple or thermopile, such motors are neither inexpensive nor compact, and therefore they would not be suitable for a portable or mobile thermoelectrodynamic prime mover.

It is therefore another object of this invention to provide a novel motor adapted to be energized by low voltage direct current and which is compact, low in cost, simple in construction and efficient in operation.

In connection with the last stated object, it is a further object of this invention to provide a low voltage D.C. motor that is very well adapted, by reason of the shape and arrangement of its parts, to comprise an element of a relatively compact and inexpensive thermoelectrodynamic prime mover.

With the above and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate several complete examples of physical embodiments of the invention constructed according to the best modes so far devised for the practical application of the principles thereof, and in which:

FIGURE 3 is a vertical sectional view of a thermoelectrodynamic prime mover incorporating another suitable type of motor;

FIGURE 4 is a horizontal sectional view taken on the plane of the line 4—4 in FIGURE 3;

FIGURE 5 is a top view on a reduced scale of a type of thermopile suitable for use in the prime mover shown in FIGURE 3; and FIGURE 6 is a vertical sectional view of a modified embodiment of the motor shown in FIGURES 3 and 4.

Figure 1:
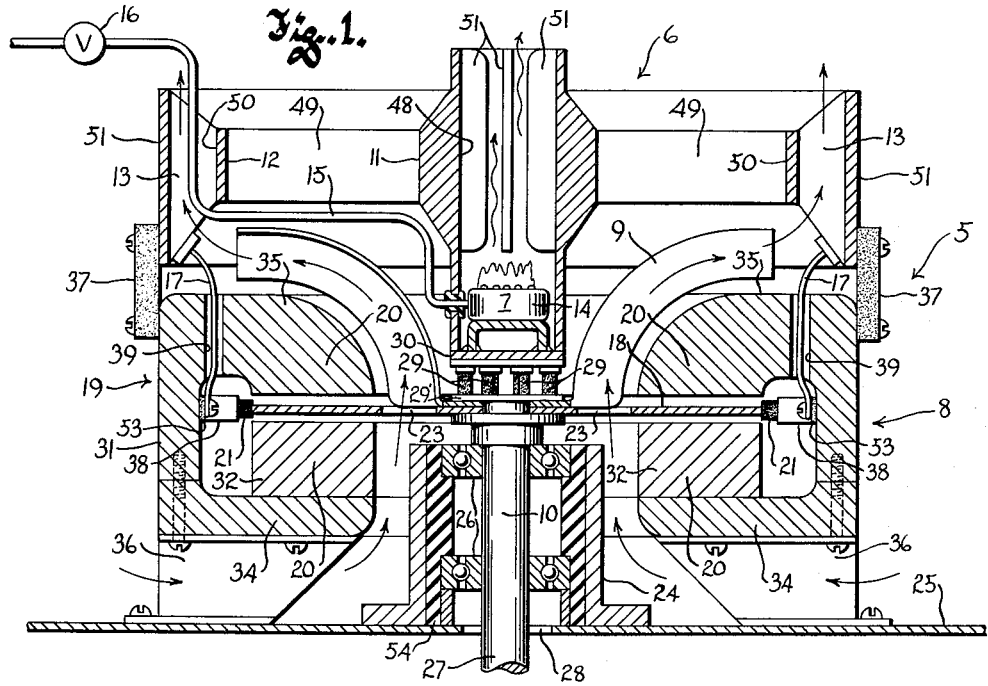
FIGURE 1 is a vertical sectional view of a thermoelectrodynamic prime mover embodying principles of this invention, taken on the axis of the machine.

Referring now to the accompanying drawings, in which like numerals designate like parts throughout the several views, the numeral 5 designates generally a thermoelectrodynamic prime mover embodying the principles of this invention and which comprises, in general, a substantially annular thermopile 6, the axis of which is upright, a coaxial heat source 7 which cooperates with the thermopile, a low voltage motor 8 coaxially mounted beneath the thermopile, and a fan 9 coaxially mounted on the shaft 10 of the motor, between the motor and the thermopile.

The annular thermopile 6 comprises an inner ring 48 of one kind of metal, a plurality of spoke-like elements 49 of a semi-conductor material such as lead telluride or bismuth telluride, and an outer metal ring 50. The radially extending spoke-like elements abut the inner ring at their inner ends, to provide a hot junction 11, and abut the outer ring at their outer ends to provide a cold junction 12, and the E.M.F. produced by the thermopile is dependent upon the difference in temperature between the two junctions. The inner and outer rings may be considered the terminals of the thermocouples comprising the thermopile, since a potential difference between them is manifested when the thermopile is in operation.

Cooling fins 13 integral with the outer ring 50 and projecting radially outwardly therefrom serve to carry heat away from the cold junction. The hot junction is heated by the heat source 7, which consists of a suitable burner 14 concentrically mounted in the thermopile, near its bottom. The burner 14 is connected by a duct 15 with a source of combustible fuel, which may be either liquid or gas, and a valve 16 in the duct 15 provides for adjustment of the rate of fuel flow to the burner to thus provide for control of the E.M.F. generated by the thermopile. Obviously suitable provision is also made for the introduction of combustion air into the duct 15. The inner ring 48 of the thermopile serves as a flue for the burner, and may be provided with integral radially inwardly projecting fins 51 for efficient conduction of heat to the hot junction.

With any of the known thermopiles, the E.M.F. produced in consequence of the temperature difference between the hot and cold junctions has a very low voltage which may be on the order of .1 or .2 volt per thermocouple, but may have very substantial current values. The coaxial mounting of the motor directly beneath the thermopile simplifies electrical connection of the thermopile to the motor, as brought out hereinafter, and results in electrical transmission losses which are negligible.

To afford desirable compactness in the machine, the motor is of the type that has a flat, disc-like rotor 18 and a stator comprising field means 19 having pole pieces 20 that lie adjacent to and face opposite surfaces of the rotor to define an axially extending air gap. In the embodiment of the prime mover of this invention illustrated in FIGURE 1, the motor is of the known homopolar type, which, besides being satisfactorily compact, is well adapted for energization from a low voltage source. The rotor in this machine is a flat disc of copper, aluminum or similar conductive material, coaxially secured and electrically connected to the shaft 10 and engaged at its periphery by a number of brushes 21. The shaft is grounded to the inner ring 48 of the thermopile, as hereinafter described, and conductors 17 connect the outer ring 50 of the thermopile with the brushes 21.

The fan or impeller 9 is coaxially secured to the motor shaft, between the motor and the thermopile, so that the fan rotates with the shaft when the machine is operating, blowing cooling air upwardly across the cooling fins 13 on the thermopile to dissipate heat from them and thus promote cooling of the cold junction of the thermocouples. An axially deep baffle ring 51 around the radially outer edges of the cooling fins, preferably formed integrally with them, guides the flow of such air across the fins. A series of circumferentially spaced apart apertures 23 may be provided in the rotor disc 18, spaced a short distance outwardly from the shaft, to permit cooling air to flow upwardly to the fan, and it will be apparent that the air drawn through these apertures also serves to cool the rotor.

A bearing cage 24 mounted on a platform 25 and provided with bearings 26 supportingly journals the medial portion of the shaft 10; and the lower end portion 27 of the shaft, which projects through an aperture 28 in the platform, provides a power take off for the machine. Preferably the shaft is insulated from the platform 25 and the field means 19 by an insulating bushing 54 in the bearing cage. At its upper end the shaft carries a contactor plate 29' slidingly engaged by brushes 29 which project downwardly from the under side of a brush holder plate 30 fixed to the bottom of the flue-like inner ring of the thermopile to thus electrically connect the shaft 10 to the thermopile. The brush holder plate may also provide a support for the fuel burner 14.

The field means 19 may comprise an annular magnetically permeable core 31 of substantially U-shaped cross section having legs 34 and 35 that project radially inwardly, and an axially magnetized annular permanent magnet 32 secured to the inner face of one leg 34 of the core. The inner face of the permanent magnet and the inner face of the other leg 35 of the core provide the pole pieces 20 which define the air gap into which the rotor projects radially a substantial distance and across which the flux path extends parallel to the axis of the rotor shaft 10.

The field means is supported on brackets 36, which hold it spaced above the mounting platform 25 to provide a passage by which cooling air may flow inwardly to the underside of the rotor. Rigid insulating supports 37 fastened to the core 31 and the outer ring 50 of the thermopile hold the thermopile concentrically spaced above the field core to provide room for the fan. Also secured to the field core are insulating supporting members 53 that carry conventional brush holders 38 in which the brushes 21 are mounted in sliding engagement with the rotor periphery. Apertures 39 in the upper leg 35 of the core permit the conductors 17 to extend from the outer ring of the thermopile to the brushes.

For efficiency a homopolar motor must have a relatively large number of brushes spaced circumferentially around the peripheral portion of its rotor, and the brushes must have as much area as possible in contact with the rotor to minimize their contact resistance. But the brushes naturally produce frictional drag, the magnitude of which is substantially in proportion to the linear speed of the rotor surface engaged by the brushes. The embodiment of the invention shown in FIGURE 2 is intended to have lower brush friction than that just described, by reason of the location of the brushes relatively close to the rotor axis, so that the linear speed of the rotor relative to the brushes is comparatively low for a given rate of rotor rotation.

Figure 2:
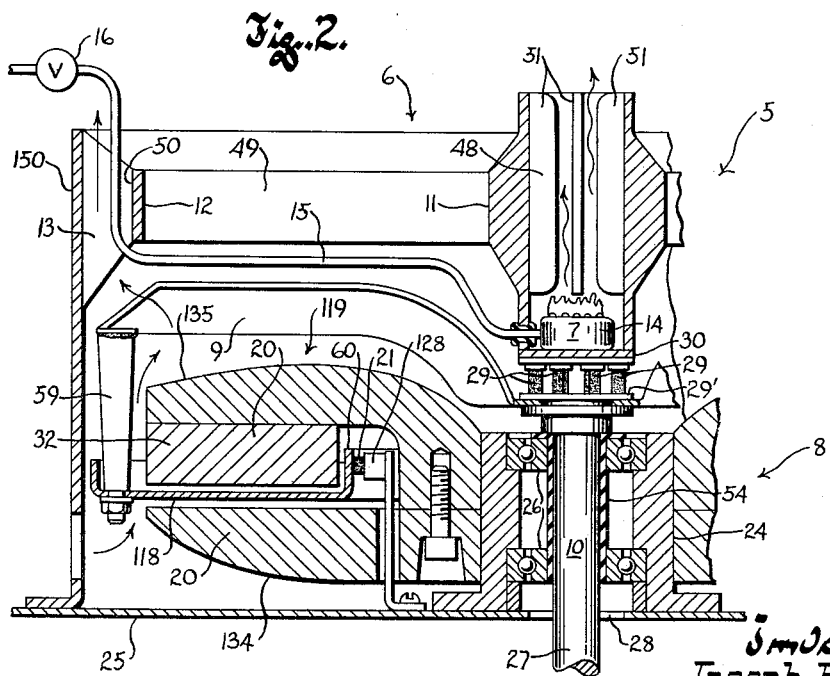
FIGURE 2 is a fragmentary vertical sectional view of a modified form of the prime mover of this invention, incorporating a somewhat different type of electric motor.

The thermopile in the prime mover shown in FIGURE 2 is similar to that described above, except that its outer ring 150 extends axially downwardly to the mounting platform 25 to provide both a support for the thermopile and an electrical grounding connection with the metal platform. The upright shaft 10 of the motor is medially journaled and supported in bearings 26 in a bearing cage 24 carried by the platform, as in the previously described embodiment of the invention, and is insulated from the bearings, and hence from the platform, by means of an insulating sleeve 54'.

The fan 9 is coaxially secured to the shaft, between the motor and the thermopile, but in this instance the fan supports the rotor 118 by means of stud-like connectors 59 projecting downwardly from the outer ends of the fan blades and secured to the rotor near its periphery, and the rotor is annular and has an axially upwardly projecting flange 60 around its inner circumference against which the brushes 21 engage. The brushes 21 may be supported by conductive holders 128 which are secured to and thus electrically connected with the platform 25, to thereby connect the brushes 21 with the outer ring 150 of the thermopile. The circuit through the rotor is completed through brushes 29 mounted on the underside of a burner supporting plate 30 which is conductingly connected to the inner ring 48 of the thermopile, and engaging a contact plate 29' on the top of the shaft, as in the previously described embodiment of the invention.

It will be observed that the inner edge of the annular rotor is radially spaced a substantial distance from the shaft 10, and the annular field means 110 is "inside out" relative to that in the FIGURE 1 embodiment of the invention, that is its legs 134 and 135 extend radially outwardly to define a radially outwardly opening air gap, and its bight portion is disposed in the space between the shaft and the rotor.

The annular permanent magnet 32, which is of course axially magnetized, may again comprise one of the pole pieces 20 of the field means.

It will be apparent that the embodiment of the invention just described lends itself readily to an obvious modification, wherein the fan is omitted, the thermopile is attached to the top of the shaft for rotation therewith, rather than fixed to the platform, and the rotor disc is carried by the thermopile. Such a structure would have disadvantages in the necessity for dynamically balancing the thermopile, but it would have advantages in affording good cooling of the cold junctions of the thermocouples.

In the embodiment of the invention illustrated in FIGURES 3, 4 and 6, the motor is of a novel type which possesses marked advantages over the homopolar motor in lightness, low cost and efficiency, and which is substantially cheaper and more compact than conventional motors suited for low voltage D.C. operation.

For use with motors of the type illustrated in FIGURES 3, 4 and 6, a series connected thermopile of the type shown in FIGURE 5 is preferred, since it has substantially higher voltage output. The radially disposed spoke-like elements 49' alternate circumferentially around the thermopile between P and N type thermoelectric materials, so that all of them are adapted to have hot junctions at their inner ends and cold junctions at their outer ends, and radially outward heat flow will produce the proper polarities for a series connection. The spoke-like members 49' are connected in pairs at their inner ends by ring segments 48' and are connected in other pairs at their outer ends by segments 50', so that the current path through the thermopile zigzags inwardly and outwardly. The terminals T, T' are preferably at the outer circumference of the thermopile. The inner segments 48' may be circumferentially extended to some extent, as shown, and provided with heat collecting fins 51', and the outer segments may be similarly extended and provided with cooling fins 13. Obviously insulating fillers could be interposed between adjacent ends of the segments of the inner and outer rings to form them into unbroken rings for the better guidance of hot gases and cooling air.

The motor in this embodiment of the invention features a rotor 218 which may be formed as a unitary stamping of conductive material such as copper or aluminum and which is engaged by the brushes near its axis so that the brushes produce relatively little friction drag. The rotor 218 comprises an outer annular rim portion 41 and a plurality of spoke-like conductors 42 that extend radially inwardly from the rim portion, terminating near the shaft. The inner end portions of the conductors 42 are circumferentially spaced apart by small distances and the conductors are thus insulated from one another except at their outer ends, which have a common connection through the rim portion of the rotor, being preferably integral with the rim portion. The spoke-like conductors have their inner ends clampingly confined between insulating washers 43 which also serve to fasten the rotor onto the shaft 10.

Instead of an annular field, as in the previously described embodiments of the invention, the motor here under consideration has circumferentially spaced apart field means 219 providing a plurality of axially extending air gaps which are intersected by the rotor. Specifically, the field means may consist of two magnetic yokes located diametrically opposite one another, each comprising a U-shaped core 331, the legs 234 and 235 of which embrace the rotor, and each having either permanent magnet means or electromagnet means to provide a flux field which extends axially through its air gap. In the version shown in FIGURES 3 and 4 permanent magnets 232 of alnico or the like, magnetically oriented axially, are secured to the inner faces of the legs 234 and 235 of the core and provide the pole pieces 20 at opposite sides of the air gap.

The brushes 121 and 221 are mounted in pairs, with each pair radially in line with one of the field means and with the individual brushes comprising each pair engaging opposite faces of the rotor at the inner ends of the spoke-like conductors 42. The mounting of the brushes in axially aligned pairs, engaging the opposite rotor faces, is for the purpose of doubling the brush contact area and thus reducing the brush resistance to half of what it would be if brushes were used at only one face of the rotor. Preferably each brush has a width circumferentially of the rotor which is at least equal to that of a spoke-like conductor, so that as the spoke-like conductors pass in engagement with it the brush is always well supported by the conductor that is leaving engagement with it until it is well supported by the conductor that is entering engagement with it. Hence the spaces between conductors at their inner ends need not be filled with insulating material to insure smooth passage of the brushes from one conductor to another. The brushes may be mounted in suitable brush holders 238 carried by insulating supporting members 153 secured to the adjacent field means cores. The pair of brushes 121 associated with one of the pole pieces is connected, by means of a conductor 117, with one terminal T of the thermopile, while the other pair of brushes 221 is connected by a conductor 217, with the other terminal T'.

The field means produce a magnetic flux across the air gap which extends a sufficient distance circumferentially of the rotor as to be linked with each spoke-like conductor at its side of the rotor at all times that such conductor is engaged by a brush, or in other words, a spoke-like conductor is not contacted by a pair of brushes until it has entered the flux field, and is disengaged from the pair of brushes before it passes out of the flux field.

As each spoke-like conductor 42 moves angularly into engagement with a pair of brushes, a diametrically opposite spoke-like conductor is also being engaged by the other pair of brushes. The flow of current through the rotor is from one pair of brushes 121, outwardly through the spoke-like conductors engaged by said brushes, then circumferentially around the rim portion 41 of the rotor and inwardly along the diametrically opposite spoke-like conductors to the pair of brushes 221 engaged with the latter. The field means have their flux fields across the air gaps oriented in axially opposite directions, and since current is flowing in radially opposite directions in the spoke-like conductors respectively engaged by the two pairs of brushes, the flux fields around the energized spoke-like conductors, due to the current through them, react with the flux fields through the air gaps to produce rotation of the rotor in the direction determined by Fleming's rule; i.e., using the left hand and pointing the index finger in the direction of flux across an air gap and the middle finger in the direction of current through the intersecting spoke-like conductor 42, the thumb will indicate the direction of force and therefore of rotor motion.

To prevent the rotor from contacting the pole pieces as a result of vibration or gyroscopic force, rubbing blocks 47 of nylon, or of graphite insulated from the motor circuits, may be mounted adjacent to the pole pieces 20. These rubbing blocks provide rotor engaging surfaces 48 that face the opposite faces of the rim portion of the rotor and lie in planes intermediate the planes of the pole pieces and of the faces of the rotor when the latter is at rest. Hence the rubbing blocks are engaged by the rotor only when the latter is in some way distorted out of normal flatness, so that the rubbing blocks do not impose a constant friction load upon the rotor.

The embodiment of the invention shown in FIGURE 6 is similar to that just described except that the field means 319 comprises wound electromagnets 332. In this instance the core 431 of each field means is substantially C-shaped, and a pair of windings 49 and 49' embrace its short inwardly extending legs 62 and 63 coaxially with one another. The opposing inner ends of the legs provide the pole pieces 20, which face opposite surfaces of the rotor. The windings 49 and 49' of each field means are connected in series with one another and with the terminals of a battery 64, with a thermoelectric generator, or with some other low voltage source of E.M.F. In some cases a motor of this invention having wound field magnets would compare fairly well in efficiency with one having permanent magnet fields, such as that illustrated in FIGURE 3, and would be less expensive to manufacture.

From the foregoing description taken together with the accompanying drawings it will be apparent that this invention provides a light, compact, efficient and inexpensive thermoelectrodynamic prime mover, comprising a thermopile, a heat source for heating the hot junction of the thermopile, a motor which is particularly adapted to be powered by low voltage E.M.F. from the thermopile, and a fan driven by the motor for cooling the cold junction of the thermopile, and wherein low voltage output of the thermopile poses no substantial electrical transmission problem because the compactness of the arrangement permits the use of very short conductors. It will also be apparent that the invention provides a novel electric motor adapted to be powered by electric current from a low-voltage source and which combines good efficiency and great compactness with low cost and simplicity.

What is claimed as my invention is:

1. A prime mover comprising: an electric motor having an upright shaft; means providing a heat source substantially on the axis of the motor shaft and axially spaced to one side of the motor; a substantially annular thermopile electrically connected with the motor and axially spaced to said one side of the motor with its hot junctions disposed near the axis of the motor shaft to be exposed to heat from said source thereof and its cold junctions spaced outwardly of said axis from the hot junctions; and a fan driven by the motor, coaxial with the motor shaft and axially intermediate the motor and the thermopile, for moving cooling air across the cold junctions of the thermopile.

2. A prime mover of the type comprising means defining a heat source, thermocouple means having hot junctions adapted to be heated by heat from said source and cold junctions adapted to be maintained at a substantially lower temperature than the hot junctions to cause current to flow in the thermocouple means, and an electric motor electrically connected with said thermocouple means, said prime mover being characterized by: the fact that the motor has its shaft upright and substantially coaxial with said means defining a heat source and disposed axially to one side thereof; further by the fact that said thermocouple means has its hot junctions disposed near the axis of the motor shaft and adjacent to the heat source, to be exposed to heat from said source, and has its cold junctions spaced radially outwardly of the motor shaft axis from its hot junctions; and further by a fan coaxially driven by the motor and axially intermediate the motor and the thermocouple means, for moving cooling air across the cold junctions of the thermocouple means.

3. The prime mover of claim 2 further characterized by the fact that the motor is of the type having a substantially flat, disc-like rotor and magnetic pole pieces overlying opposite faces of the disc.

4. A prime mover of the type comprising a heat source, thermocouple means having hot junctions exposed to heat at said source and cold junctions located in a zone of substantially lower temperature, and an electric motor connected with the thermocouple means to be energized by current flowing as a consequence of the temperature difference between the junctions of the thermocouple means, said prime mover being characterized by the fact that: the motor is of the type comprising a disc like rotor having substantially radially extending conductor surfaces, magnet means having pole pieces at opposite faces of the rotor defining an axially extending air gap through which the rotor disc extends transversely, and brushes connected with the thermocouple means and engaging the rotor to contact said conductor surfaces and send current therethrough in directions substantially radially of the rotor.

5. The prime mover of claim 4, further characterized by the fact that said rotor disc has a circumferentially continuous conductive peripheral portion, and said substantially radially extending conductor surfaces comprise spoke-like conductors electrically connected with and extending radially inwardly from said peripheral portion of the disc but otherwise insulated from one another; and further characterized by the fact that the brushes engage the inner end portions of said conductors so that current flows from one brush to another radially outwardly along the conductor engaged by said one brush, around a part of said conductive peripheral portion of the disc, and radially inwardly along the conductor engaged by said other brush.

6. An electric motor adapted to be energized by low voltage direct current, comprising: a disc-like rotor having a circumferentially continuous rim portion of electrically conductive material and a plurality of spoke-like conductors electrically connected with the rim portion and extending substantially radially inwardly therefrom, said conductors being electrically insulated from one another at their inner ends; means mounting the rotor for rotation about its axis; a plurality of magnet means mounted at circumferentially spaced intervals around the rotor and each having a pair of pole pieces overlying opposite faces of the rotor and cooperating to define an axially extending air gap which is intersected by the rotor; and a plurality of brushes fixed with respect to the rotor and engaging the same at circumferentially spaced intervals therearound, near the radially inner ends of the spoke-like conductors, said brushes being connectable with the terminals of a current source and cooperable with one another and the rotor to conduct a flow of current radially outwardly through a conductor engaged by one brush, around a part of the rim portion of the rotor, and radially inwardly through a conductor engaged by another brush.

7. An electric motor adapted to be energized by direct current, of the type having a disc-like rotor mounted for rotation on its axis, magnet means with pole pieces overlying opposite faces of the rotor and defining axially extending air gaps intersected by the rotor, and brushes connectable with a source of current and engaged with the rotor to send current substantially radially therethrough: said motor being characterized by the fast that its rotor has a circumferentially continuous peripheral portion of conductive material and a plurality of spoke-like conductors extending radially inwardly from said peripheral portion and electrically connected therewith but being otherwise insulated from one another; and further characterized by the fact that the brushes are so disposed as to contact the rotor at the inner end portions of the spoke-like conductors at circumferentially spaced apart locations, so that current flowing from one of said brushes to the other through the rotor flows radially outwardly through a conductor with which said one brush is engaged, around a part of the peripheral portion of the rotor, and radially inwardly along a conductor with which the other brush is engaged.

8. The electric motor of claim 7, further characterized by the fact that the conductive peripheral portion of the rotor and the spoke-like conductors thereof are integral with one another.

9. The electric motor of claim 7, further characterized by the fact that the peripheral portion of the rotor and the spoke-like conductors are formed as integral parts of of a unitary stamping of conductive sheet material.

10. The electric motor of claim 7, further characterized by the fact that said magnet means comprises permanent magnets.

11. The electric motor of claim 7, further characterized by the fact that each of said magnet means comprises: a core having an axially extending member fixed outside the periphery of the rotor, arms extending from said member substantially radially inwardly over opposite faces of the rotor disc, and pole pieces on said arms facing the rotor disc; and windings on said core adapted to be energized by direct current from a source thereof.

12. An electric motor adapted to be energized by direct current from a source thereof from which a large current is available at low voltage, said motor comprising: a disc-like rotor having a plurality of spoke-like substantially radially extending conductors, all connected to one another at their outer ends by a peripheral conductor but otherwise insulated from one another; means mounting said rotor for rotation on its axis; a plurality of magnet means mounted at fixed circumferentially spaced locations around the rotor axis and each having pole pieces that closely flatwise overlie opposite faces of the rotor to define an axially extending air gap transversely intersected by the rotor; and a plurality of brushes connectable with a low voltage high current D.C. source, mounted at circumferentially spaced apart locations around the rotor axis and engaging the inner ends of the spoke-like conductors to cause current to flow radially outwardly through a conductor engaged by one brush, partway around the peripheral conductor, and radially inwardly along the conductor engaged by another brush.

13. The motor of claim 12, further characterized by the fact that said disc-like rotor comprises a unitary member having the radially extending conductors and the peripheral conductor integral with one another.

14. The motor of claim 13, further characterized by rubbing blocks of low friction material fixed adjacent to each of the magnet means and having opposing surfaces normally slightly spaced from the opposite surfaces of the rotor, near the periphery of the rotor, to be engaged by the rotor and thus confine the same against excessive axial displacement at the locations where it passes through the air gaps to thereby prevent it from rubbing on the pole pieces.

References Cited in the file of this patent

UNITED STATES PATENTS

| | | |
|---|---|---|
| 496,514 | Fritsche | May 2, 1893 |
| 2,961,474 | Fritts | Nov. 22, 1960 |

OTHER REFERENCES

Electronics, March 20, 1959, pages 70–73.